Aug. 29, 1950  A. TUSTIN  2,520,582
ROTATING MACHINE
Filed Feb. 25, 1947
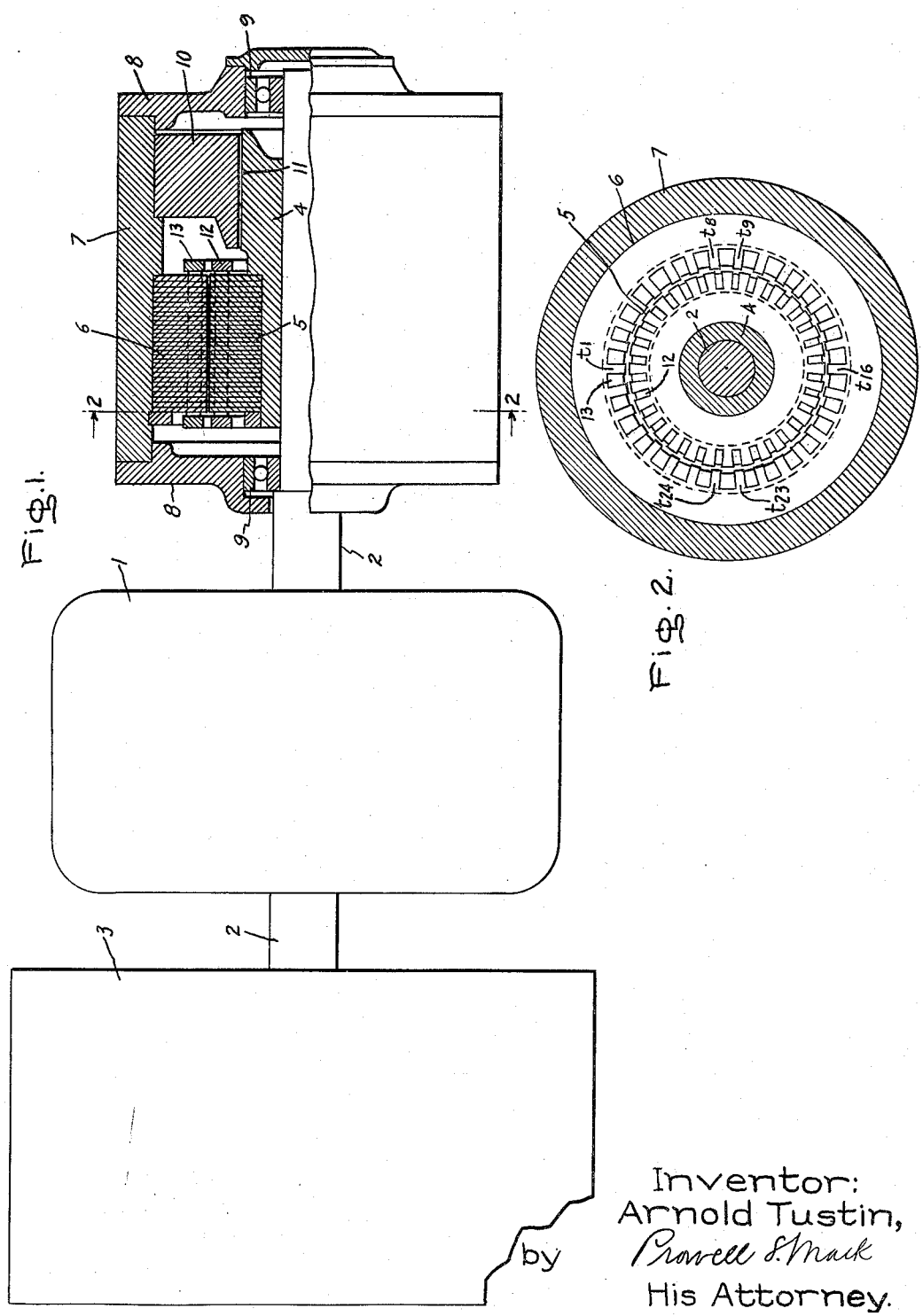
Inventor:
Arnold Tustin,
by Prowell S. Mack
His Attorney.

Patented Aug. 29, 1950

2,520,582

UNITED STATES PATENT OFFICE 2,520,582

ROTATING MACHINE

Arnold Tustin, Sheffield, England, assignor, by mesne assignments, to General Electric Company, a corporation of New York Application February 25, 1947, Serial No. 730,873
In Great Britain May 6, 1943

Section 1, Public Law 690, August 8, 1946
Patent expires May 6, 1963

5 Claims. (Cl. 74—574)

My invention relates to rotating machines, and more specifically to an improved vibration damping device for suppressing torsional oscillations of shafts and other rotating members.

In a rotating machine, torsional oscillations, such as are caused by fluctuating load or an intermittently applied power source, vary in amplitude according to so-called "resonant frequencies" or "critical speeds" of the mechanical system. The amplitudes of such torsional oscillations or vibrations often reach dangerous proportions, placing damaging stresses and strains upon the component parts of the machine.

Various devices for overcoming these objectionable oscillations have heretofore been used. These devices include the well-known flywheel, hydraulic couplings, spring or rubber couplings, friction clutches, and cooperating magnetic members. Each of these types performs its function of damping out the torsional oscillations by absorbing from the mechanical system energy which such oscillations create.

Torsional oscillation damping devices heretofore used have been somewhat unsuccessful because they either, like the simple flywheel, have critical frequencies which tend to build up rather than damp out oscillations, or they prove unresponsive to relatively small oscillations and vibrations.

It is an object of my invention to provide simple and inexpensive means for overcoming these difficulties, by providing an improved and novel torsional oscillation damping device.

In accordance with the illustrated embodiment of my invention, the means employed comprises an inner and an outer rotating magnetic member and means for exciting said members so that magnetic flux passes from one to the other. The inner member is solidly rotatable with the shaft, oscillation of which is to be damped. The outer member rotates freely about the shaft and comprises or is associated with a damping structure of substantial inertia. Both members have teeth and windings forming a conductor system located in slots between the teeth. At steady speeds both members, due to bearing friction, rotate together. Torsional oscillations of the shaft, however, result in dissipation of energies within said windings due to relative movement between the members. An important feature of my invention is that the tooth pitch of the two members is different and in some instances, as hereinafter explained, this feature actually amplifies the effect of torsional oscillations and causes a superior and instantaneous damping reaction to any such oscillations.

Other aspects of the invention will appear from consideration of the following description taken in connection with the accompanying drawing.

In the drawing, Fig. 1 is a side elevational view partly in section of a machine suitably embodying my invention. Fig. 2 is a cross-sectional view taken on line 2—2 of Fig. 1.

I have shown in Fig. 1 the embodiment of my invention in connection with an engine 1 having a shaft 2 capable of being rotated by said engine. At one end of the engine, shaft 2 is coupled to and drives a load 3. At the other end of the engine, shaft 2 drives members which in combination as hereinafter more fully described act as a torsional oscillation damping device.

An annular solid magnetic member 4 is fixedly attached to shaft 2. Mounted to rotate with said magnetic member 4 and, therefore, with shaft 2 is an annular toothed magnet member 5 of laminated construction. A cooperating toothed magnetic member 6, also of laminated construction, is secured to a cylindrical casing 7 of magnetic material. Said cylindrical casing is loosely supported by end disks 8 and antifriction bearings 9 so that it rotates about but not necessarily with shaft 2. Due to friction in bearings 9 as well as magnetic coupling between the members, the cooperating toothed members are lightly coupled together so as to normally rotate together although they are, nevertheless, capable of independent relative rotation. Casing 7 has secured to it an annular permanent magnet 10, the inner cylindrical surface of which is separated by a small air gap from a corresponding cylindrical surface 11 formed at one end of solid magnetic member 4. Permanent magnet 10 is polarized radially so as to cause magnetic flux to pass over the small air gap between the laminated magnetic members 6 and 5 and to return by way of the surface 11.

The arrangement of teeth of members 5 and 6 is shown more clearly in Fig. 2. It will be observed that both magnetic members have uniformly distributed teeth but that the tooth pitch, or angular distance between tooth centers, of the member 5 differs a small fraction from the tooth pitch of member 6. In the embodiment of my invention illustrated in the drawing, the tooth pitch of member 5 is slightly smaller than that of member 6, member 5 having thirty-two teeth and member 6 having thirty teeth. A closed circuit winding is placed on at least one of said members, and in the embodiment illustrated squirrel cages 12 and 13, the bars of which are located in the slots between the teeth of members 5 and 6, respectively, are mounted on said members so that flux variations in the teeth will induce corresponding currents in said windings which then act as damping conductor systems.

In the operation of the damping device shown in the drawing, the degree of alignment of each tooth of the outer member 6 with the nearest adjacent tooth of the inner member 5 will, for a given relative position of said member, vary in a cyclical manner around the air gap between said members. For example, in the illustrated relative position of the two members shown in Fig. 2, a tooth of the inner member is completely aligned with tooth $t1$ of the outer member and proceeding in a clockwise direction the amount of alignment of teeth of the inner member with successive teeth of the outer member progressively reduces and becomes a minimum at teeth $t8$ and $t9$ and then the amount of alignment progressively increases until the tooth $t16$ is reached. Thereafter the alignment is progressively reduced until the teeth $t23$ and $t24$ are reached and then the alignment progressively increases to the point of beginning, which is the tooth $t1$. Inasmuch as the reluctance of a magnetic path is directly proportional to the length of any air gap therein, it follows that in the illustrated relative position of the two members shown in Fig. 2, the reluctance of the path through and between the various teeth will be at a minimum through tooth $t1$, at a maximum through $t8$ and $t9$ and so on. Thus there are four zones alternately of low and high reluctance of the air gap between the inner and the outer members. Movement of the inner member relative to the outer member will modify this distribution. It will be noted that a movement of the inner member with respect to the outer member to the extent of one-half tooth pitch will cause a flux distribution shift of approximately 90°. Movement to the extent of a full tooth pitch has the effect of causing rotation of the flux distribution through approximately one-half revolution (actually one-half revolution plus one tooth pitch), and so on. It follows that the speed of rotation of the flux with respect to each member will be fifteen times the relative difference in speed of the two members.

Movement of the flux distribution with respect to the inner and outer members 5 and 6 will induce corresponding currents in the squirrel cage windings 12 and 13, respectively, whereby relative movement of the two members will be resisted. In the embodiment illustrated, casing 7 and all parts solidly attached to it form a rotatable structure of substantial inertia acting as a damping mass. For steady speed of the shaft 2, outer member 6 and attached casing 7, together with the permanent magnet member 10, will be carried around either with very little slip or at the same speed as the shaft, due to bearing friction. However, any oscillating component in the rotation of the shaft will, since inertia of the outer member and parts to which the latter is attached prevent said outer member following said oscillating component, result in a variation of the flux distribution causing currents to flow in the squirrel cages whereby the energy of the oscillation will be dissipated and the oscillation suppressed. Since the flux distribution executes a considerable displacement with respect to both the inner and outer toothed members for a small relative movement of said members, the currents induced in the squirrel cages will be large so that a very effective damping action is produced.

Thus there is provided a device of the character described which is capable of meeting the objects hereinbefore set forth and of acting as a shock absorber to rapidly and effectively damp out torsional oscillations whether of large or small value, thereby improving the efficiency, lengthening the life, and simplifying the construction of the entire rotating machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In a rotating machine, a rotatable shaft, a toothed magnetic member rotatable with said shaft, a cooperating toothed magnetic member, means for causing magnetic flux to pass between said magnetic members by way of the teeth thereof, and conductor systems provided in slots between said teeth, said cooperating member being lightly coupled to said first member so as to normally rotate in unison therewith but being nevertheless capable of independent rotation and being associated with a damping mass, said magnetic members having different tooth pitches and being so mounted for relative rotational movement that the teeth of one member may move past the teeth of the other member, whereby torsional oscillations of said shaft may be damped.

2. In a rotating machine, a rotatable shaft, a member rotatable with said shaft and having a number of uniformly distributed teeth, another member having a different number of uniformly distributed teeth and comprising a structure of substantial inertia, said members being mounted for relative rotational movement so that the teeth of the two members pass each other, means for producing flux excitation in said members, and a closed circuit winding on at least one of said members, whereby torsional oscillations occurring in said shaft will cause movement of flux distribution in said members and flow of current in said winding.

3. In a rotating machine, a rotatable shaft, a member rotatable with said shaft and having a number of uniformly distributed teeth, another member having a different number of uniformly distributed teeth and comprising a structure of substantial inertia, said members being mounted for relative rotational movement so that the teeth of the two members pass each other, means for producing flux excitation in said members, and closed circuit windings on said members, whereby torsional oscillations occurring in the rotation of said shaft will cause movement of flux distribution in said members and flow of currents in said windings.

4. In a rotating machine, a driving apparatus and cooperating toothed magnetic members, one of said members being solidly rotatable with said driving apparatus and the other of said members being rotatable about the same axis and associated with a damping mass, the two magnetic members being so mounted that relative rotational movement between them causes movement of the teeth of said members past one another, the teeth of said members being so arranged that the tooth pitches of the two members are different from one another, with the number of teeth of each of said members being relatively large compared to the difference of the number of teeth on the two members, and said magnetic members being provided with damping windings and with excitation means for causing magnetic flux to pass from the teeth of one member to the teeth of the other, whereby torsional oscillations originating in the driving apparatus are damped.

5. In a rotating machine, a rotatable shaft, an annular solid magnetic member coupled to said shaft, a laminated magnetic rotor coupled to said solid member so as to rotate with said shaft and containing electroconductive windings and having teeth evenly spaced about its periphery, a cylindrical casing loosely supported for free rotation about said shaft, an annular laminated magnetic member attached to the inner surface of said casing and containing electroconductive windings and having teeth evenly spaced about its inner periphery and arranged to pass by the teeth hereinbefore mentioned, the two laminated magnetic members having a different number of teeth, an annular permanent magnet polarized radially and interspaced between the aforesaid solid magnetic member coupled to the shaft and the aforesaid casing so as to cause flux to pass from the teeth of one of said laminated members to the teeth of the other, whereby torsional oscillations will be electrodynamically damped.

ARNOLD TUSTIN.

REFERENCES CITED

The following references are of record in the file of this patent:

UNITED STATES PATENTS

| Number | Name | Date |
|---|---|---|
| 1,298,375 | Neuland | Mar. 25, 1919 |
| 2,320,721 | Ericson | June 1, 1943 |